R. H. BRODERICK.
CAMERA.
APPLICATION FILED APR. 6, 1914.
1,129,448.
Patented Feb. 23, 1915.
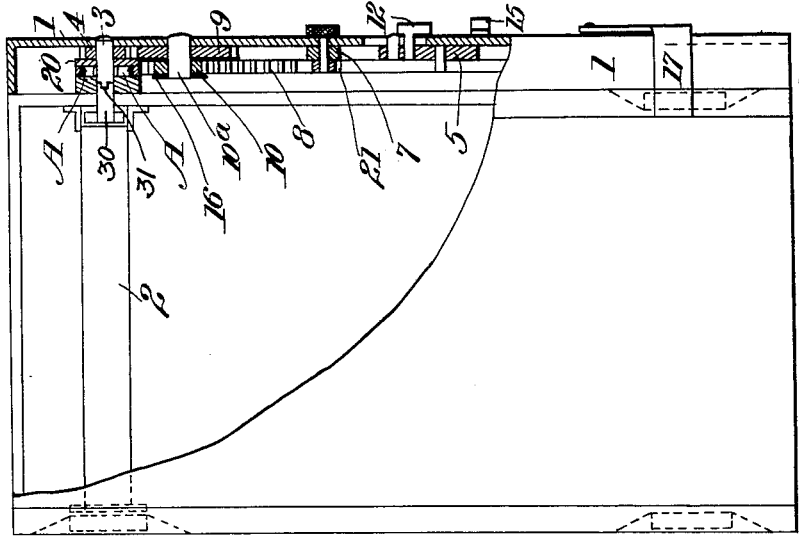
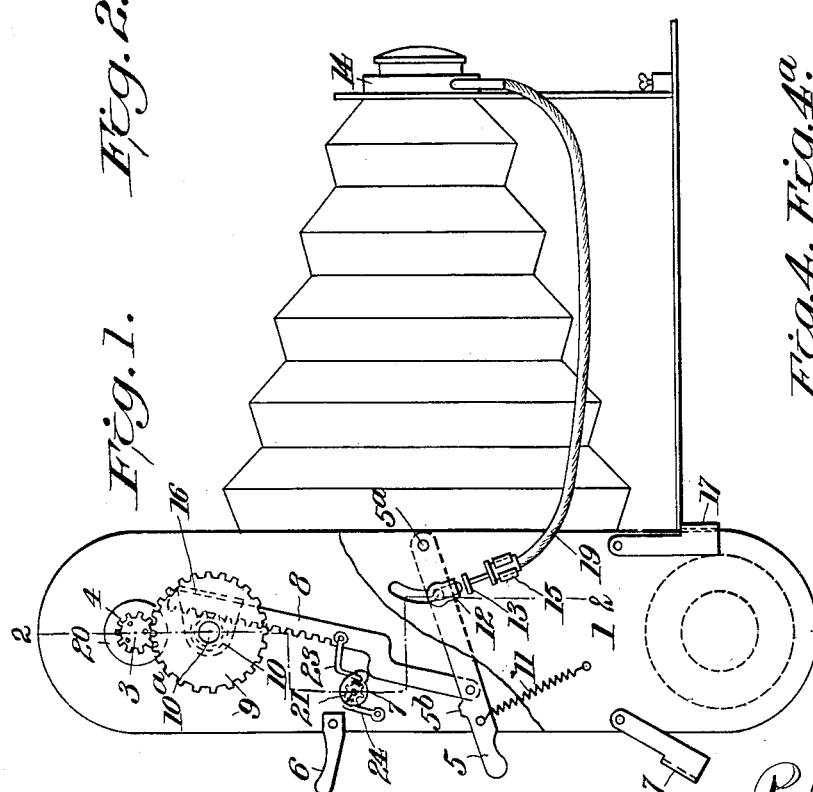
Witnesses
C. M. Walker
M. Rogers
Inventor
Robert H. Broderick
By John A. Bommhardt
Attorney

UNITED STATES PATENT OFFICE.

ROBERT H. BRODERICK, OF BETHLEHEM, PENNSYLVANIA, ASSIGNOR OF ONE-HALF TO ALBERT CANNING, JR., OF BETHLEHEM, PENNSYLVANIA.

CAMERA.

1,129,448. Specification of Letters Patent. Patented Feb. 23, 1915.

Application filed April 6, 1914. Serial No. 829,849.

*To all whom it may concern:*

Be it known that I, ROBERT H. BRODERICK, citizen of the United States, residing at Bethlehem, in the State of Pennsylvania, have invented certain new and useful Improvements in Cameras, of which the following is a specification.

This invention relates to cameras, and comprises a rapid exposure repeating attachment to be applied to roll film cameras, having for its object to provide improved means for exposing portions of the film in rapid succession, the means for advancing the film being operatively connected to the shutter so that both are successively operated at the proper times.

A further object of the invention is to provide improved means for compensating for the increased size of the roll as the film is wound thereon, so as to bring proper parts of the film in the requisite exposure positions.

The invention may be applied to various types of cameras, such as folding or box types employing a roll film.

One embodiment of the invention is illustrated in the accompanying drawings, in which:—

Figure 1 is a side elevation of a camera of the folding type, provided with the improvement, parts being broken away. Fig. 2 is a sectional view on the line 2—2 of Fig. 1. Figs. 3, 4, 4$^a$, 5, 5$^a$, 6, 6$^a$, and 6$^b$ are details of various parts of the attachment.

Referring specifically to the drawings, 1 indicates a casing which may be stamped or formed from sheet metal, and which is attached to the side of the camera box which contains the film spool 2, which is provided with a winding pin 30 projecting into the casing 1. This pin has a cross groove or socket in its outer end engaging with a clutch projection 31 on a turning pin 3, mounted on the casing and carrying a loose pinion 4 which by intermediate gearing is operated by a finger lever 5 pivoted at 5$^a$ to the side of the casing. A thumb piece 6 is attached to the casing to receive the thumb, the lever 5 being conveniently operated by a finger of the same hand. The lever 5 has a lug 5$^b$ arranged to stop against a cam 7 when the lever is moved toward the piece 6.

The lever 5 is pivotally connected to a rack 8 which meshes with a pinion 10 on a pin 10$^a$ carrying a gear 9 which meshes with the pinion 4, so that when the lever 5 is operated the roll 2 is turned to wind the film. A spring 11 returns the lever after each operation, and said lever carries a lug 12 which, when the lever returns, strikes a push button 13 on the shutter release tube 19 which opens the shutter 14 and makes the exposure on the film. A spring clip 15 holds the tube in place on the side of the casing. The rack 8 works through a guide 16, shown in detail in Figs. 4 and 4$^a$, for holding the rack in mesh with the gear 10. The casing 1 is attached to the side of the camera by a clip 17, permitting removal of the attachment when desired.

The pinion 4 carries a gripping attachment or clutch 20 which engages the winding pin 3 when the pinion is turned in one direction, and which slips in the other direction. This clutch comprises pawls A pivoted to or within the part 20 and provided with cam surfaces, pressed against the pin 3 by springs B and arranged to catch in one direction and turn the pin, and to slip when the pinion 4 is turned in the opposite direction, thus avoiding slack or back lash of the film when the lever 5 is returned to normal position.

The cam 7 is shaped to shorten each successive movement of the lever 5 to compensate for the increasing diameter of the film spool as the film is wound thereon. This cam 7 is turned by means of a spring pawl 23 carried by the rack 8 and engaging a ratchet 21 attached to the cam, and so at each operation of the rack, the cam is turned. A detent 24 prevents back slip of the cam, the periphery of which, as stated, forms a varying stop for the movement of the lever 5.

In operation, each movement of the lever 5 turns up the film a certain distance, and on reverse movement of the lever 5 the shutter is operated to give the exposure, and at the same time the cam 7 will turn to vary the subsequent stroke of the lever. The operation may be quickly repeated to give rapid successive exposures on succeeding sections of the film. By detaching the shutter operating device, both the shutter and the film can be independently operated if desired.

The attachment can be applied to existing cameras either of the folding or box type, without material modification, and the invention is not limited to the exact embodiment shown and described.

What I claim as new is:—

1. In a repeating attachment for roll film cameras, the combination with the film roller, of a lever, operating connections between the lever and the roller, a cam stop for the lever, to compensate for varying diameter of the roll, and means actuated by the lever to advance the cam at each operation of the lever.

2. In a repeating attachment for roll film cameras, the combination with the film roller, of a pinion and clutch adapted to grip and turn the roller in one direction, a driving gear for the pinion, a rack engaging the gear, an operating lever connected to the rack, and a movable compensating stop for the lever, and automatically actuated thereby.

3. In a repeating attachment for roll film cameras, the combination with the film roller, of an operating lever, operating connections between the lever and the roller, a movable compensating stop for the lever, and means automatically actuated by the lever to advance the stop at each operation of the lever.

4. In a repeating attachment for roll film cameras, the combination with the film roller and its box, of a casing attachable to the box, an operating lever on the casing, operating connections between the lever and the roller, to turn the latter when the lever is moved in one direction, a shutter operating device, and means on the casing to hold the said device in position to be engaged and operated by the lever when it moves in the other direction.

5. In a repeating attachment for roll film cameras, the combination with the film roller and its box, of a casing, a clip for removably attaching the casing to the box, an operating lever on the casing, operating connections between the lever and the roller, to turn the latter when the lever is moved in one direction, a shutter operating device, and a clip on the casing engageable with said device to hold the same in position to be operated by the lever on its reverse stroke.

6. In a repeating attachment for roll film cameras, the combination with the film roller, of an operating lever, operating connections between the lever and the roller, including a reciprocating rack, a pivoted cam stop for the lever, a ratchet attached to the cam, and a pawl attached to the rack and engaging the ratchet to turn the cam at each operation of the lever.

In testimony whereof, I do affix my signature in presence of two witnesses.

ROBERT H. BRODERICK.

Witnesses:
EDWIN A. ALTENDERFER,
CHARLES W. SCHULER.